(12) United States Patent
Belge et al.

(10) Patent No.: US 7,263,121 B2
(45) Date of Patent: Aug. 28, 2007

(54) METHOD AND APPARATUS FOR DETERMINING A TOPOLOGY OF A SUBSCRIBER LINE LOOP

(75) Inventors: Murat Belge, North Chelmsford, MA (US); Rainer Storn, Kirchheim (DE)

(73) Assignee: Infineon Technologies AG, Munich (DE)

( * ) Notice: Subject to any disclaimer, the term of this patent is extended or adjusted under 35 U.S.C. 154(b) by 731 days.

(21) Appl. No.: 10/669,362

(22) Filed: Sep. 25, 2003

(65) Prior Publication Data

US 2005/0069028 A1    Mar. 31, 2005

(51) Int. Cl.
H04B 1/38 (2006.01)
(52) U.S. Cl. .................................... 375/222
(58) Field of Classification Search ................ 375/222, 375/219, 220, 224
See application file for complete search history.

(56) References Cited

U.S. PATENT DOCUMENTS 6,965,657 B1* 11/2005 Rezvani et al. ............. 375/346
7,006,445 B1* 2/2006 Cole et al. .................. 370/247
7,076,010 B1* 7/2006 Heidari et al. .............. 375/346

OTHER PUBLICATIONS

Press et al., "Numerical Recipes in C: The Art of Scientific Computing", 2nd Edition, Cambridge University Press, 1992, pp. 444-455, (12 pages).
Ali et al., "A Numerical Comparison of Some Modified Controlled Random Search Algorithms", Journal of Global Optimization 11, 1997, pp. 377-385 (15 pages).
Storn et al., "Differential Evolution—A Simple and Efficient Adaptive Scheme for Global Optimization over Continuous Spaces", International Computer Science Institute, 1995, pp. 1-12 (12 pages).

* cited by examiner

Primary Examiner—Emmanuel Bayard
(74) Attorney, Agent, or Firm—Maginot, Moore & Beck

(57) ABSTRACT

An xDSL modem for data transmission between a central office and a customer device over a subscriber line includes a topology determining unit and a control unit. The topology determining unit is configured to determine the topology of the subscriber line. The control unit is configured to switch the xDSL modem between a normal mode for data transmission and a topology determining mode for determining the topology of the subscriber line.

18 Claims, 14 Drawing Sheets

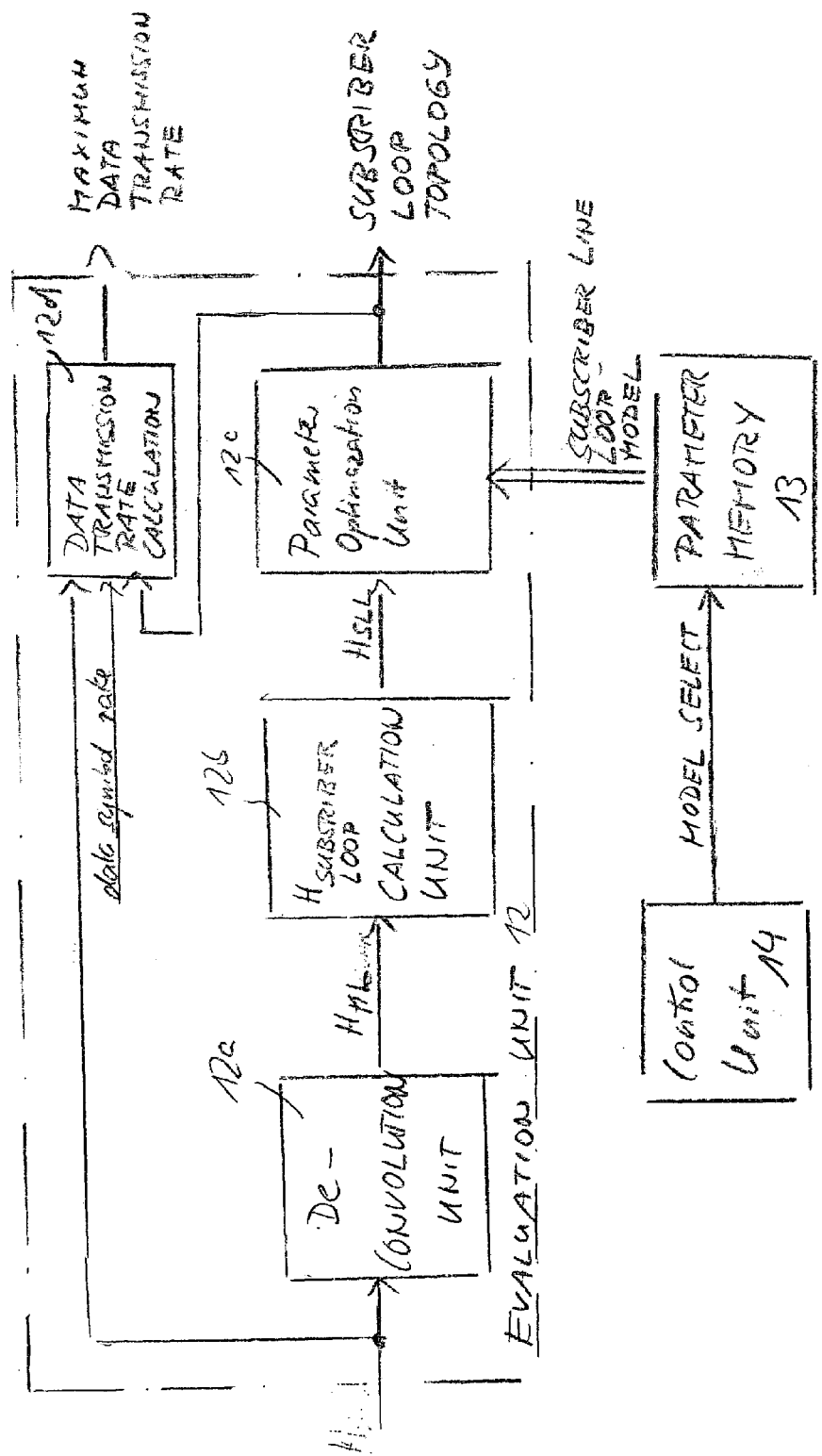

SUBSRIBER LOOP TOPOLOGY

| Cable | Cable Length | Cable Diameter | Cable TYPE |
|---|---|---|---|
| $C_1$ | $\ell_1$ | $\varnothing_1$ | $T_1$ |
| $C_2$ | $\ell_2$ | $\varnothing_2$ | $T_2$ |
| $C_3$ | $\ell_3$ | $\varnothing_3$ | $T_3$ |
| ... | ... | ... | ... |
| $C_N$ | $\ell_N$ | $\varnothing_N$ | $T_N$ |

Fig. 10

METHOD AND APPARATUS FOR DETERMINING A TOPOLOGY OF A SUBSCRIBER LINE LOOP

FIELD OF THE INVENTION

The invention refers to a method and an apparatus for determining a topology of a subscriber line loop (SLL), and in particular to an xDSL modem comprising a topology determining unit for determining the topology of a subscriber line.

DESCRIPTION OF THE RELATED ART

FIG. 1 shows an ADSL modem according to the state of the art. The data source provides a stream of data bits to a framer to which in series a cyclic redundancy coder CRC, a scrambler a Reed Solomon coding device and an Interleaver are connected. Further, a QAM trellis coder and a calculation unit performing an inverse fast Fourier transformation (IFFT) are provided. The output of the IFFT unit is connected to a transmit filter having a digital filter part and an analogue filter part. The transmit signal path of the ADSL modem as shown in FIG. 1 has the framer, the scrambler, the cyclic redundancy coding device, the Reed Solomon Coder, the Interleaver the QAM trellis coder, the IFFT unit and the transmit filter.

The reception signal path of the xDSL modem shown in FIG. 1 has a receiving filter, a calculation unit for performing a fast Fourier transformation, a QAM trellis decoder, a De-Interleaver, a Reed Solomon decoder, a descrambler, a unit for tracking a cyclic redundancy coding and a deframer.

The output of the data transmission signal path and the input of the data receiving signal path in the xDSL modem are connected to a hybrid circuit. The hybrid circuit transmits analogue signals via a line driver and a subscriber line connected to a customer device. The xDSL modem shown in FIG. 1 is located within a central office, wherein the xDSL modem is provided for data transmission between the central office and the customer device over the subscriber line. The customer device is e.g. a telephone. The subscriber line loop is normally made up of a twisted pair of copper wires, which are concatenated to each other in the form of a signal transmission channel between the central office and the customer device which is located within the customer's home.

The xDSL modem shown in FIG. 1 according to the state of the art further hass an echo signal compensating unit for compensating the echo signal received from the subscriber line. The echo signal has a near end echo signal which originates from the transmitting signal which is directly coupled within the xDSL modem to the receiving signal path and a far end echo signal coming from the subscriber line. In a normal data transmission mode, the echo compensating unit performs a compensation of the received echo signals.

Customers use ADSL for a variety of valuable services such as streaming video, digital radio and voice transmission. Unlike cable modems, ADSL can dedicate bandwidth to each and every customer, not just to one entire neighborhood. DMT-ADSL is designed to operate even in the presence of interferences and phone line impairments, however, this can significantly reduce data rates. DMT-ADSL frequency tones, i.e. carrier frequencies, carry upstream and downstream data. A lower frequency band is allocated for upstream data transmission, and a higher frequency band is allocated for downstream data transmission. Further, a POTS frequency band up to 4 kHz is allocated for carrying voice signals and is not used for data transmission.

There are several sources of noise and interference which degrade the performance of an xDSL data link. Interference sources that impair the xDSL data rates are in particular signal attenuation, i.e. the distance between the customer device and the central office, bridged taps, wire gauges, crosstalk radio signal and in-home impairments.

There is a great drop in data rate when xDSL services are delivered further from the central office. While customers within 10,000 feet of the central office enjoy a maximum performance achievable with ADSL, customers as far as 18.000 feet are still capable of receiving data rates as high as e.g., 400 Kbps.

An accurate measure of the subscriber loop length is important in establishing achievable data bit rates. Before offering a data rate to a particular customer, service providers need to know how far a customer is from their central office. This is typically performed by using different methods and a process referred to as a loop pre-qualification.

Some traditional testing techniques according to the state of the art which have largely been inherited from standard voice telephony testing requirements are able to perform rudimentary tests on copper lines to estimate their length. These measurements provide an approximate idea of the data rate that can be delivered over the subscriber line but do not take into account the impact of the interference caused by a disturbing subscriber lineloop topology.

A disturbing interference may be caused by a so-called bridged tap. A bridged tap is a wire connected to the phone line that is open on the far end. A bridged tap causes an impedance discontinuity at the point of connection, because the impedance on one side of the bridged tap connection is smaller than the impedance of the cable on the other side of the bridged tap connection. Accordingly, a bridged tap causes two reflected pulses, one from the point of connection and one from the terminated end of the bridged tap separated in time by the two-way propagation time from the beginning to the end of the bridged tap. Depending on the length from the location and the number of bridged taps, the impact on the ADSL data rates can be significant. The closer the bridged taps are to one end of the subscriber line, the greater is the impact they will have on the data transmission capacity of the subscriber line.

A further impairment caused by unfavorable subscriber line topologies are in-home impairments. Telephone wires inside homes are often spliced to serve several telephones around the house. Theses splices have the same effect as bridged taps and similarly impair data rates. Since such splices are normally close to a customer's modem, they have the most damaging effect on the ADSL data rates.

A further impact on the xDSL data rates is the thickness of the phone wire gauges. The thicker the phone wire gauge, the more bandwidth can be utilized for ADSL.

A typical subscriber line loop (SLL) is made up of several working sections of different gauges and possibly some bridged taps. Each section of the subscriber line loop can be composed of a different type of wire. A twisted pair of copper wires are differentiated from each other by the physical parameters, i.e. their length, their characteristic impedance $Z_0$ and the propagation constant $\gamma$.

The characteristic impedance $Z_0$ and the propagation constant $\gamma$ are specified per unit length of the wire and are frequency-dependent complex quantities. They are determined by their thickness, conductor spacing and the insulation of the wire. There are several different cables deployed in the field, and a gauge's number is associated with the most commonly used wires. For example, in the U.S., a gauge number is assigned to denote the wire gauge, e.g. 19, 22, 24 and 26 gauge wires are the most commonly used twisted pairs and their characteristic impedances $Z_0$ and propagation constants $\gamma$ are known. In Europe, the data transmission wires are referred to by their thickness, such as a 0.4 mm wire, 0.5 mm wire, etc.

Time domain reflectometry (TDR) is a remote sensing electrical measurement technique according to the state of the art that has been used to determine special locations and the nature of various objects. An early form of time domain reflectometry TDR is radar where a radio transmitter is used to emit a short pulse of microwave energy and a sensitive radio receiver is used to pick up the echo returned from a distant object, such as an airplane or ship. The time difference between the transmitted signal pulses and the received signal pulses is a measure of the distance between the transmitter and the target knowing that the electromagnetic waves travel with the speed of light. A detailed analysis of the echo signal reveals additional details of the reflecting objects, such as their shapes, dimensions, etc. which helps to identify the object.

For xDSL technology, it is important to provide information about the potential connection quality between the central office and the customer's device. This way, the customer can be supplied with data bit rate estimation information before the customer subscribes to the service.

As outlined above, the topology of the subscriber line loop (SLL) between the central office and the customer device, in particular in the presence of bridged taps, different wire gauges of the concatenated a pairs of copper wires and splices within the house of the customer have a strong impact on the data transmission bit rate.

The conventional xDSL modem according to the state of the art as shown in FIG. 1 has the drawback that it does not have any means to measure the possible data transmission bit rate between the xDSL modem within the central office and the customer's device.

Accordingly, service providers have used an external measurement equipment to measure possible data rate between the central office and the customer's device.

This has several disadvantages. An external measurement equipment is necessary which is operated by a technician. Consequently, it has been quite expensive to get an approximate idea of the possible data transmission bit rate. Further, the drawback of using the conventional external measurement equipment is that with these traditional testing techniques the topology of the subscriber line loop (SLL) is not considered. Since the subscriber line loop topology, such as bridged taps, different wire gauges and splices within the customer's house, has a strong impact on the data transmission bit rate conventional testing techniques using external measurement equipment connected to the subscriber line, provide only a very rough estimate of the possible data transmission bit rate.

SUMMARY OF THE INVENTION

Accordingly, it is a feature of the present invention to provide an xDSL modem allowing the determination of the physical structure of the subscriber line loop to which the modem is connected.

The invention provides an xDSL modem for data transmission between a central office and a customer device over a subscriber line wherein the xDSL modem has a topology determining unit for determining the topology of the subscriber line.

Since the topology determining unit is integrated within the xDSL modem, no external measurement equipment is necessary.

A further object of the present invention is to provide an xDSL modem which allows a more accurate calculation of possible maximum data transmission rates between the central office and the customer's device.

Accordingly, the invention further provides an xDSL modem for data transmission between a central office and a customer device over a subscriber line, wherein the xDSL modem may include: a topology determining unit for determining the topology of the subscriber line by evaluating an echo signal of the subscriber line, and a data transmission bit rate calculating circuit for calculating a maximum data transmission bit rate of the subscriber line depending on the echo signal, the determined topology of the subscriber line and a data symbol rate.

One advantage of this xDSL modem is that since it takes into account the detected topology of the subscriber line, the calculated maximum possible data transmission bit rate is much more accurate than a bit rate estimated by conventional measurement techniques.

A further advantage is that the data transmission bit rate calculating circuit is integrated within the xDSL modem so that no external measurement equipment and employment of a technician is necessary.

In a preferred embodiment, the topology determining unit includes a signal generator for generating at least one signal pulse which is transmitted to the subscriber line loop (SLL), an echo detection unit for detecting an echo signal received from the subscriber line loop (SLL), an evaluation unit which is connected to said echo detection unit, wherein the evaluation unit has a deconvolution unit for deconvolving the detected echo signal to determine a transfer function $H_{ML}$ of a measurement loop (ML) between said signal generator and said echo detection unit, a calculation unit for calculating a transfer function $H_{SLL}$ of the subscriber line loop (SLL) between the xDSL modem and the customer device on the basis of the determined transfer function $H_{ML}$ of the measurement loop (ML), a model parameter optimization unit for optimizing a model transfer function $H_{SLLM}$ of a subscriber line loop model (SLLM) so that an error function between the model transfer function $H_{SLLM}$ and the calculated transfer function $H_{SLL}$ of the subscriber line loop is minimized.

In a preferred embodiment, a model parameter memory is provided for memorizing at least one parameter vector having model parameters of a subscriber line loop model.

In a further embodiment, a control unit is provided which switches the xDSL modem between a normal mode for data transmission and a topology determining mode for determining the topology of the subscriber line.

In a preferred embodiment, the control unit switches in the topology determining mode, the signal generator of the topology determining unit to the subscriber line loop via a first switch and the echo determining unit to the subscriber line loop via a second switch.

In a preferred embodiment, the model parameter memory has several parameter vectors for different subscriber line loops.

In a preferred embodiment, a parameter vector is selected by the control unit for optimization by the parameter optimization unit.

In a preferred embodiment of the xDSL modem according to the present invention, the optimized model parameters indicate the subscriber line loop topology.

In a preferred embodiment, the customer's device is a telephone.

In a preferred embodiment of the xDSL modem according to the present invention, the POTS equipment is used to detect whether the telephone is on hook or off hook.

In a preferred embodiment, the control unit does not switch to the topology determining mode when the telephone is off hook.

In a still further preferred embodiment, a data transmission bit rate calculation circuit is provided for calculating a maximum data transmission bit rate of the subscriber line depending on the detected echo signal and the data symbol rate.

In a preferred embodiment, the signal generator generates a sequence having a plurality of signal pulses.

The amplitude of each pulse is in a preferred embodiment smaller than a dynamic range of an analogue front end (AFE) of the xDSL modem.

In a preferred embodiment, the xDSL modem has an echo cancellation unit which is activated in the normal mode and which is deactivated in the topology determining mode.

The present invention further provides a topology determining unit for determining a topology of a subscriber line loop (SLL) including a deconvolution unit for deconvolving an echo signal of at least one signal pulse sent by said topology determining circuit to determine a first transfer function $H_{ML}$ of a measurement loop (ML), a calculation unit for calculating a second transfer function $H_{SLL}$ of the subscriber line loop (SLL) on the basis of the first transfer function $H_{ML}$, and a model parameter optimization unit for optimizing a model transfer function $H_{SLLM}$ of a subscriber line loop model (SLLM) such that an error function of the difference between the model transfer function $H_{SLLM}$ and the calculated second transfer function $H_{SLL}$ of the subscriber line loop (SLL) is minimal.

The invention further provides an optimization unit for providing a topology of a subscriber line loop (SLL), wherein the optimization unit optimizes model parameters of a predetermined transfer function $H_{LLLM}$ of a subscriber line loop model which is stored in a memory such that an error function of the difference between the model transfer function $H_{SLLM}$ and a calculated function $H_{SLL}$ of the subscriber line loop (SLL) is minimized, wherein the optimized model parameters output by said optimization unit indicate the topology of said subscriber line loop (SLL).

The invention further provides a method for determining a topology of a subscriber line loop (SLL) including the following steps: optimizing the model parameters of a model transfer function $H_{SLLM}$ of a subscriber line loop model (SLLM) stored in a memory such that an error function of a difference between a model transfer function $H_{SLLM}$ and a calculated transfer function $H_{SLL}$ of the subscriber line loop (SLL) is minimized, outputting the optimized model parameters which indicate the topology of the subscriber line loop (SLL).

The invention further provides a method for determining a topology of a subscriber line loop (SLL) having the following steps, namely transmitting at least one signal pulse generated by a signal generator to a subscriber line, detecting the echo signal received from the subscriber line loop (SLL) by an echo signal detection unit, deconvolving the detected echo signal to determine a transfer function $H_{ML}$ of a measurement loop (ML) between the signal generator and said echo detection unit, calculating a transfer function $H_{SLL}$ of the subscriber line loop (SLL) on the basis of the determined transfer function $H_{ML}$ of the measurement loop (ML), optimizing a subscriber line loop model transfer function $H_{SLLM}$ such that an error function of the difference between the model transfer function $H_{SLLM}$ and a calculated transfer function $H_{SLL}$ of the subscriber line loop (SLL) is minimized, wherein the model parameters of the optimized transfer function $H_{SLLMopt}$ of the subscriber line loop model are output as the topology of the subscriber line loop (SLL).

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings, and wherein:

FIG. 7 shows a block diagram of an evaluation unit within the topology determining unit according to the present invention;

FIG. 10 shows an example for a subscriber line loop topology output by the topology determining unit according to the present invention;

DETAILED DESCRIPTION OF THE PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 2:
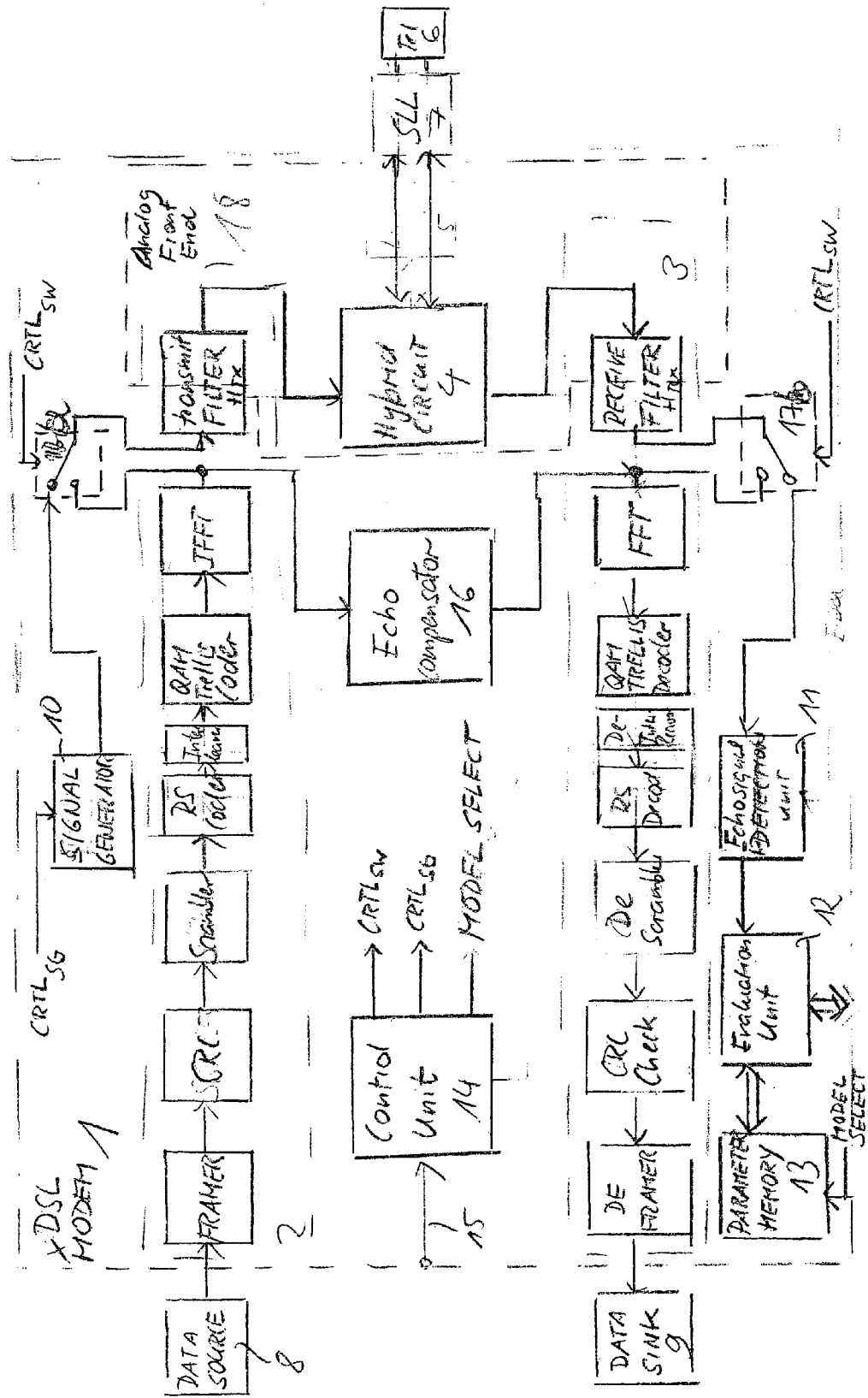
FIG. 2 shows a preferred embodiment of the xDSL modem according to the present invention.

Referring to the drawings wherein like characters represent like elements, as can be seen from FIG. 2, the xDSL modem 1 according to the present invention has a data transmission signal path 2 and a receiving signal path 3. Like a conventional xDSL modem, the data signal transmitting path has a framer, a CRC unit, a scrambler, a Reed Solomon coding device an Interleaver, a QAM trellis coder, an IFFT calculating unit and a transmit filter having a transfer function $H_{TX}$.

The receiving signal path 3 of the xDSL modem 1 has a receiving filter having a transfer function $H_{TX}$, a FFT calculating unit, a QAM trellis decoder, a De-Interleaver a Reed Solomon decoder, a CRC check descrambler, a unit and a deframer. The output of the transmitting signal path 2 is connected via a line to a hybrid circuit 4. Further, the input of the receiving signal path 3 is connected to the hybrid circuit 4. The hybrid circuit 4 is connected via an analogue line driver 5 and a subscriber line loop 7 to the customer's device 6. The subscriber line loop 7 between the line driver 5 and the customer's device 6 has an unknown subscriber line loop topology. The subscriber line loop 7 has at least one pair of twisted copper wires. The copper wires can include concatenated copper wires of different with gauges. Further unknown bridged taps and slices may exist.

The xDSL modem 1 as shown in FIG. 2 is located within the central office. It receives a data bit stream from a data source 8, processes the received data bit stream within the data transmission signal path 2 and sends an analogue data signal to the customer's device 6 via the hybrid circuit 4, the line driver 5 and the unknown subscriber line loop 7.

In the same manner, the xDSL modem 1 receives an analogue data signal from the customer's device 6 via the subscriber line loop 7, the hybrid circuit 4 and processes the analogue signal within the signal receiving path 3. The received data bit stream is supplied to a data sink 9.

The xDSL modem 1 as shown in FIG. 2 according to the present invention further includes a topology determining unit to determine the topology of the subscriber line loop 7.

The topology determining unit of the xDSL modem 1 as shown in FIG. 2 includes a signal generator 10 for generating at least one signal pulse which is transmitted to the subscriber line loop 7, an echo detection unit 11 for detecting an echo signal received from the subscriber line loop 7, an evaluation unit 12 which is connected to the echo detection unit 11 for evaluating the received echo signal and to provide optimized model parameters indicating the topology of the subscriber line loop 7. The evaluation unit 12 is connected to a parameter memory 13 in which at least one parameter vector having model parameters of a subscriber line loop model (SLLM) is stored.

The xDSL modem 1 according to the preferred embodiment of the invention as shown in FIG. 2 includes a control unit 14 controlling a first switch 17a and a second switch 17b. The xDSL modem 1 according to the present invention is switchable between a normal mode for data transmission and a topology determining mode for determining the topology of the subscriber line 7.

Figure 1:
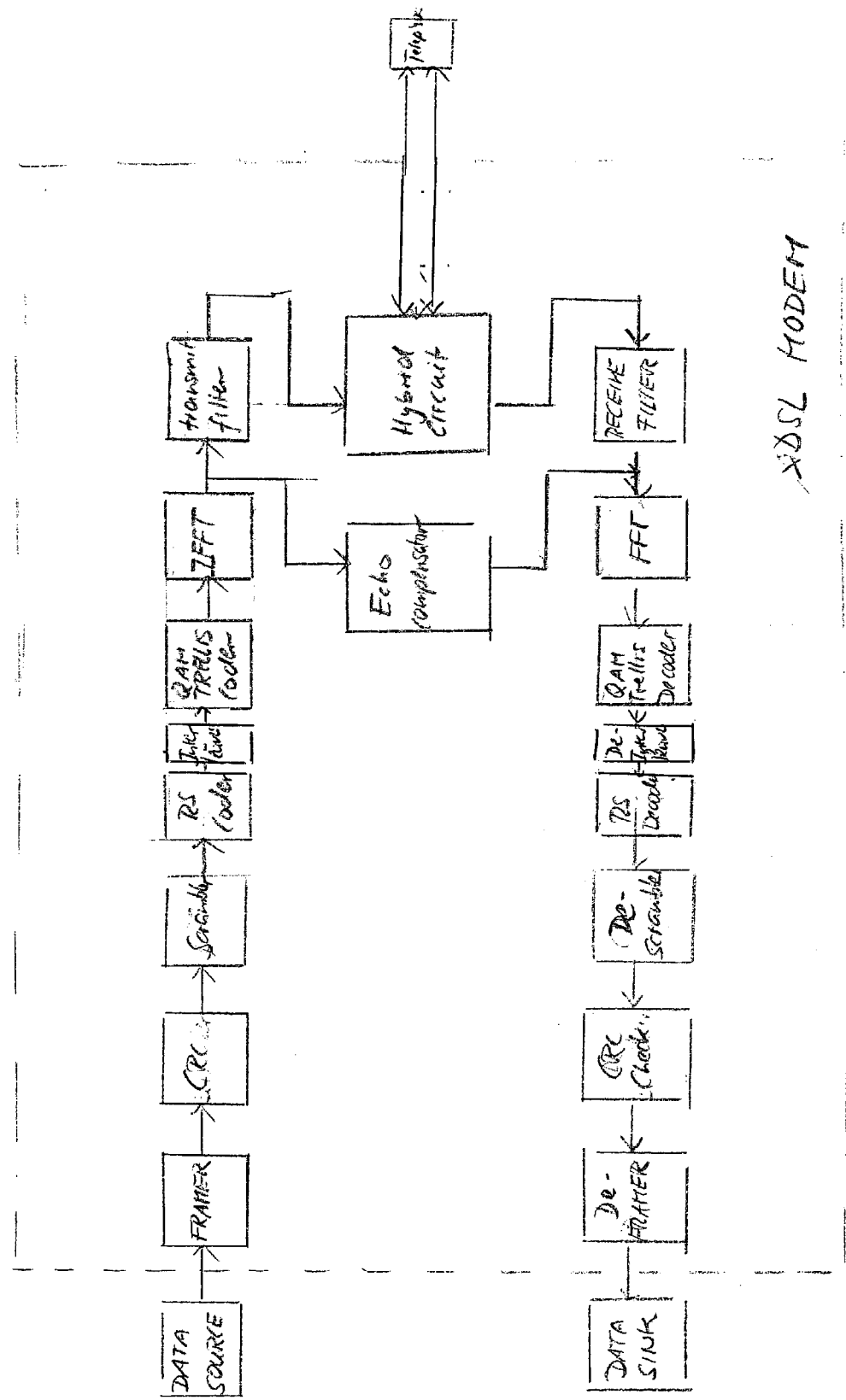
FIG. 1 shows an ADSL modem according to the state of the art.

In the normal data transmission mode, the control unit 14 switches (CRTL$_{SW}$)the first switch 17a such that the output of the IFFT calculating unit is directly connected to the transmit filter $H_{TX}$. Further, the control unit 14 switches (CRTL$_{SW}$) the second switch 17b such that the output of the receiving filter $H_{RX}$ is directly connected to the input of the FFT calculating unit. In this normal mode, the xDSL modem 1 according to the present invention operates in the same manner as a conventional xDSL modem as shown in FIG. 1.

Using a control input 15, the xDSL modem 1 according to the present invention can be switched from the normal data transmission mode to a topology determining mode for determining the topology of the subscriber line 7. The integrated control unit 14 switches in the topology determining mode switch 17a such that the output of the signal generator 10 is connected to the transmit filter. Further, the second switch 17b is switched so that the output of the received filter $H_{RX}$ is directly connected to the input of the echo signal detection unit 11.

The xDSL modem 1 as shown in FIG. 2 includes an echo compensator 16 which compensates in the normal mode the echo signals received by the receiving signal path 3 of the modem 1. As can be seen from FIG. 2, when the control unit 14 switches the first switch 17a to the signal generator 10 and the second switch 17b to the echo detection unit 11, the echo compensator 16 is deactivated so that the received echo signals are not compensated in the topology determining mode.

Figure 3:
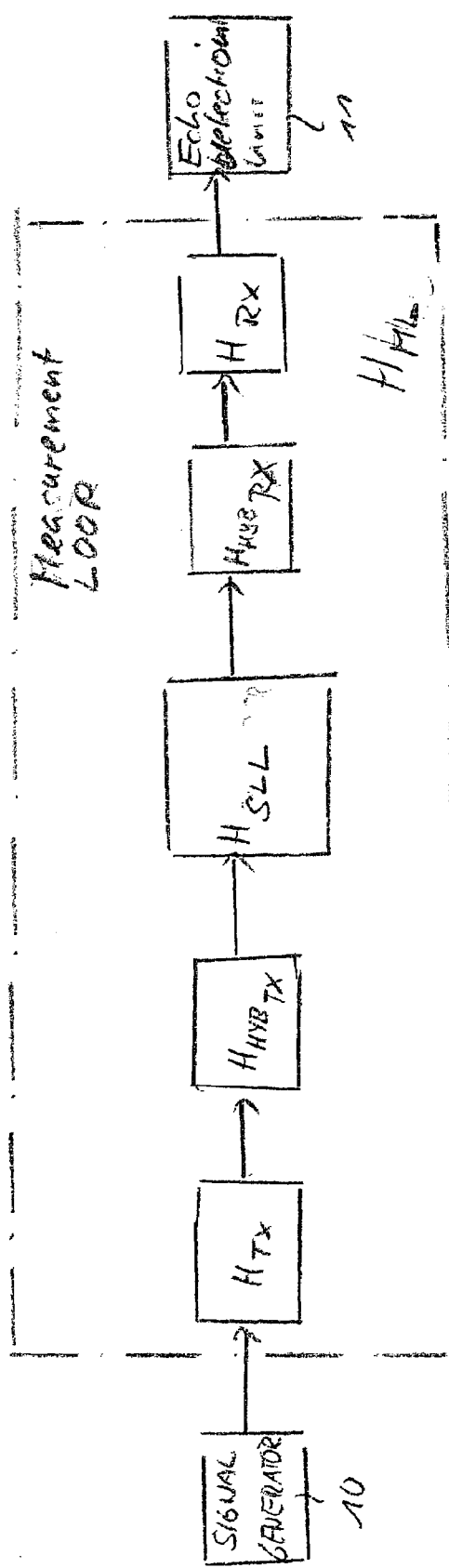
FIG. 3 shows a measurement loop according to the present invention.

After the xDSL modem 1 has switched from the normal data transmission mode to the topology determining mode, a measurement loop ML is created as shown in FIG. 3. The signal generator 10 sends pulse signals via the transmit filter $H_{TX}$, the transceiving part of the hybrid circuit 4, the subscriber line loop SLL 7 to the customer's device 6 and the transmitted analogue signal is then received by the echo detection unit 11 via the receiving part of the hybrid circuit 4 and the receiving filter $H_{RX}$.

In a preferred embodiment, a POTS equipment is used to detect whether the telephone 6 is on hook or off hook. If it is detected that the telephone is off hook, the control unit 14 does not switch to the topology determining mode. As soon as it is detected that the telephone is on hook, the xDSL modem 1 switches to the topology determining mode. If the telephone 6 is off hook, its impedance is adapted to the impedance of the subscriber line loop SLL so that the amplitude of the echo signal is not very high. Since the topology determining unit evaluates the echo signal for determining the subscriber line loop topology, it is preferred that the telephone 6 is on hook when determining the subscriber line loop topology. Since the impedance of the telephone is in this case almost infinitely high a strong signal reflection leads to a strong echo signal.

Figure 4:
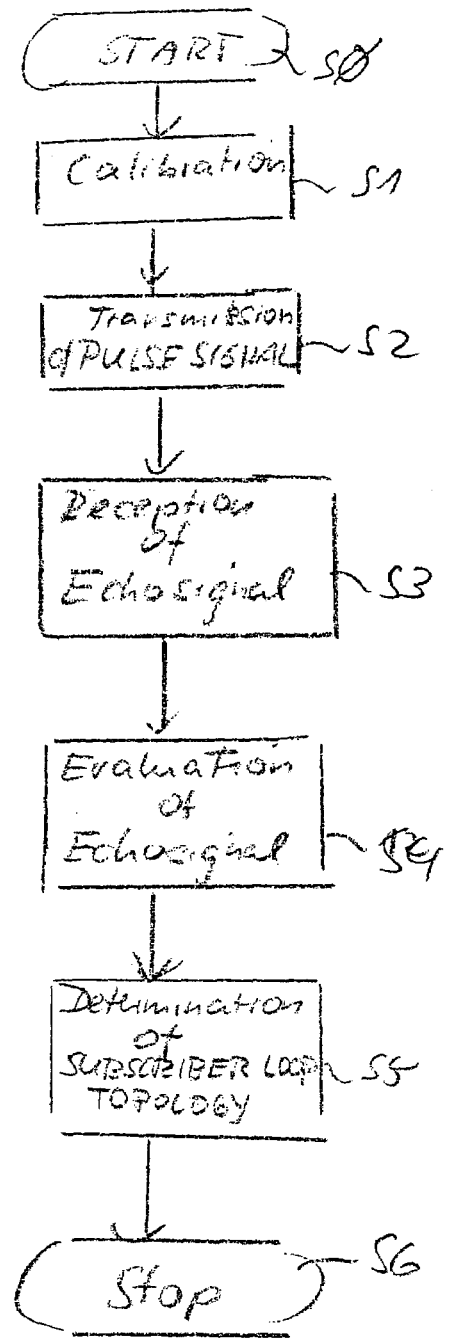
FIG. 4 shows a flow chart of the method for determining the subscriber loop topology according to the present invention.

FIG. 4 shows a flow chart for illustrating how the subscriber line loop topology of the subscriber line loop 7 is determined by the xDSL modem according to the present invention.

After starting in step S0, the modem 1 can be calibrated in a step S1. This step S1 is optional to detect a type of cable used. In most cases, the type of cable used is known and the corresponding parameters are stored within the parameter memory 13. In such cases, a calibration step S1 is not necessary.

In a step S2, the signal generator 10 sends at least one signal pulse via the subscriber line 7 to the customer's device 6. If the customer's device 6 is on hook, so that a strong reflection is generated, an echo signal from the customer's device is received by the echo signal detection unit 11 in step S3.

Further, in step S4, the evaluation of the echo signal is performed by the evaluation unit 12. By optimizing model parameters of a predetermined transfer function $H_{SLLM}$ of a subscriber line loop model SLLM stored in the parameter memory 13, the optimized model parameters are output by the evaluation unit 12 in a step S5 wherein the optimized model parameters indicate the topology of the subscriber line loop 7.

The process stops in step S6.

Figure 5:
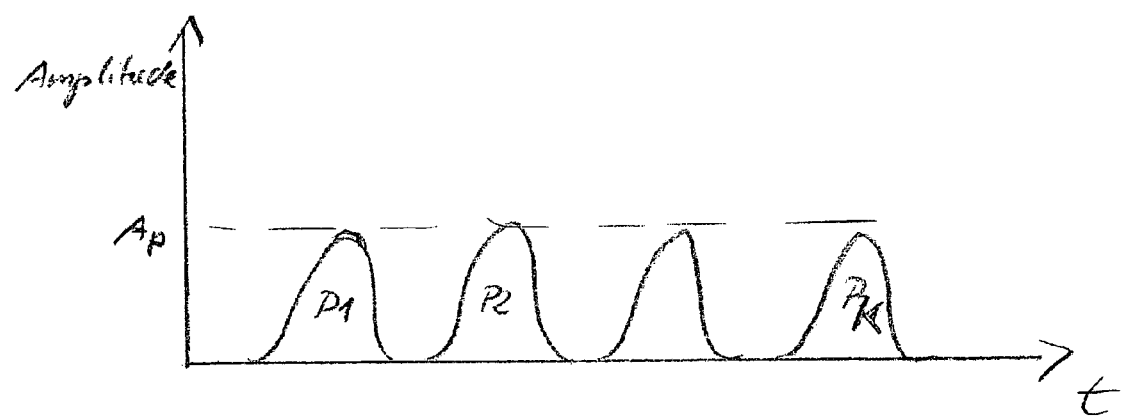
FIG. 5 shows a signal diagram of a signal generated by a signal generator within the topology determining unit according to the present invention.

FIG. 5 shows an example of a measuring signal generated by the signal generator 10. The signal generator 10 generates in a preferred embodiment a sequence including a plurality of signal pulses. Each signal pulse is formed in such a manner that it provides a broad frequency spectrum. The number of signal pulses can vary between one and several thousand signal pulses. The amplitude of the signal pulses is chosen to be smaller than the dynamic range of an analogue front end 18 within the xDSL modem 1 as shown in FIG. 2. This is important since in the topology determining mode the echo compensator 16 is deactivated. A further reason to keep the amplitude of the signal pulses low is to avoid disturbances on other subscriber lines during the measurement process. When decreasing the amplitude of the signal pulses, the number of impulses employed has to be increased to keep the aggregate signal power at a certain level. Further, by increasing the number of employed signal pulses, the signal power S is increased, so that the signal-to-noise ratio SNR of the measuring signal is enhanced.

In a preferred embodiment there is a time delay between two following pulses so that interferences caused by overlapping echo signals are avoided.

The topology determining unit includes the signal generator 10, the echo detection unit 11 and an evaluation unit 12.

Figure 6:
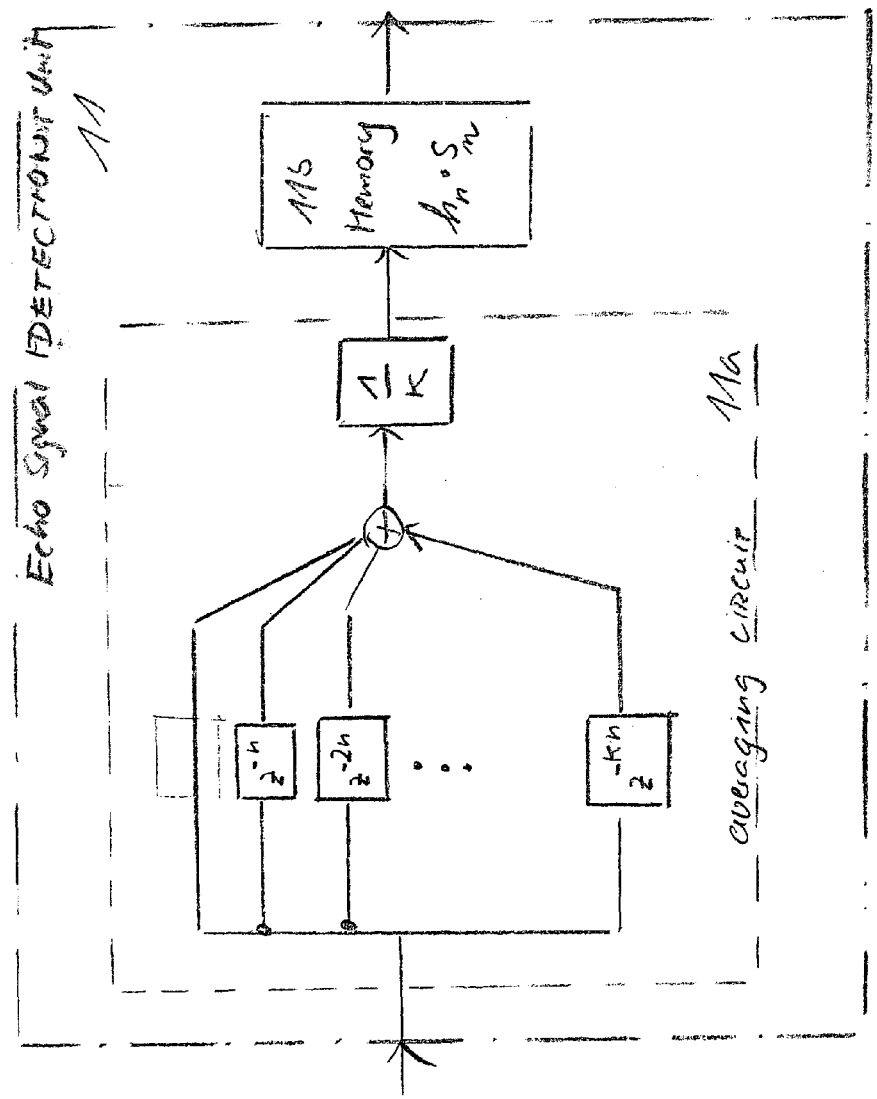
FIG. 6 shows a block diagram of a preferred embodiment of an echo signal detection unit within the topology determining unit according to the present invention.

FIG. 6 shows a preferred embodiment of the echo signal detection unit 11. The echo signal detection unit 11 receives the digital echo signal samples from the second switch 17b and performs the averaging of the echo samples via an averaging circuit 11a. The averaging circuit 11a includes k time delay circuits having different time delays wherein k is the number of the sent pulses generated by the signal generator 10 within one sequence, n is the number of samples within the echo signal which are looked at, wherein n depends on the topology of a subscriber line. The output terminals of the delay circuits are connected to a summing device applying the summed-up samples to a division circuits which divides the digital value by the number of sent pulses k. The purpose of the averaging circuit 11a is to minimize the impact of noise on the received echo signal. The output of the averaging circuit 11a is connected to a memory 11b which stores the signal response of the measurement loop ML.

FIG. 7 shows a preferred embodiment of the evaluation unit 12 which is connected to the echo signal detection unit 11 shown in FIG. 6. The evaluation unit 12 includes a deconvolution unit 12a for deconvoluting the detected echo signal. The deconvolution unit 12a determines the transfer function $H_{ML}$ of the measurement loop ML between the signal generator 10 and the echo detection unit 11 as shown in FIG. 3.

Further, the evaluation unit 12 includes a calculation unit for calculating a transfer function $H_{SLL}$ of the subscriber line loop 7 between the xDSL modem 1 and the customer device 6 on the basis of the determined transfer function $H_{ML}$ of the measurement loop.

$$H_{ML}=H_{TX} \cdot H_{HYBTX} \cdot H_{SLL} \cdot H_{HYBRX} \cdot H_{RX} \quad (1)$$

Accordingly, the calculation unit 12b calculates the transfer function of the subscriber line loop:

$$H_{SLL}=H_{ML} \cdot H_{TX}^{-1} \cdot H_{HYBTX}^{-1} \cdot H_{HYBRX}^{-1} \cdot H_{RX}^{-1} \quad (2)$$

Since the transfer function $H_{ML}$ of the measurement loop has been determined by the deconvolution unit 12a and the remaining inverse transfer functions of the transmitting filter, the transmitting part of the hybrid circuit 4, the receiving part of the hybrid circuit 4 and of the receiving filter are known, the calculation unit 12b is able to calculate the transfer function $H_{SLL}$ of the subscriber line loop 7.

The evaluation unit 12 further includes a parameter optimization unit 12c for optimizing a model transfer function $H_{SLLM}$ of a subscriber line loop model SLLM such that an error function between the model function $H_{SLLM}$ and the calculated transfer function $H_{SLL}$ calculated by the calculation unit 12b is minimized. The subscriber line loop model SLLM is memorized by the parameter memory 13 of the ADSL modem 1. In the parameter memory 13, at least one subscriber line loop model SLLM is stored. In a preferred embodiment, several subscriber line loop models are stored, and the control unit 14 selects a certain subscriber line loop model SLLM.

Different subscriber line loop models SLLM may be selected for different situations, e.g. for different countries or for detecting load coils, i.e. so-called pupin coils, which work as low-pass filters to eliminate high-frequency interferences in telephone lines.

Figure 8A:
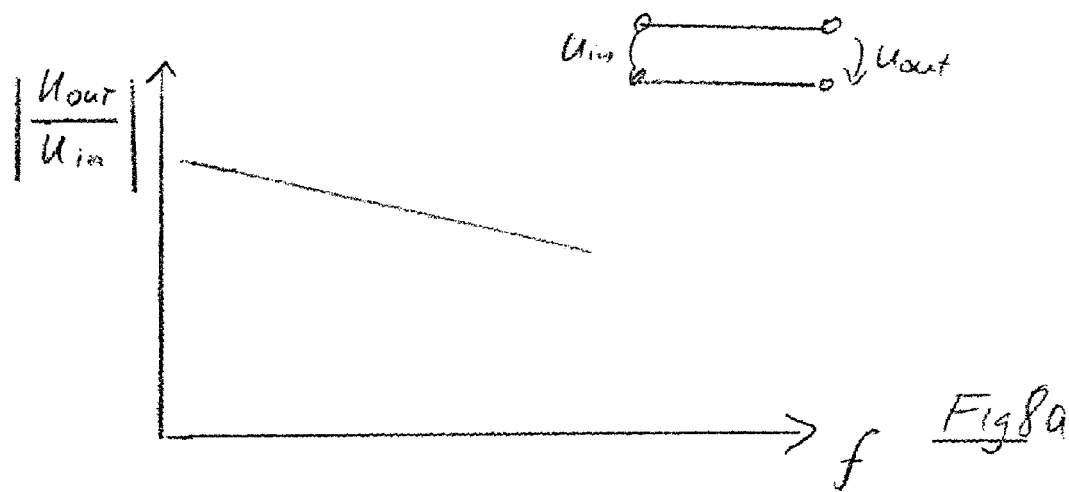
FIGS. 8a and 8b show a frequency dependency of the subscriber line loop without bridged taps in comparison to the frequency dependency of the subscriber line loop (SLL) with bridged taps.

FIG. 8a shows the transfer function of a subscriber line loop 7 which includes a pair of twisted copper wires.

Figure 8B:
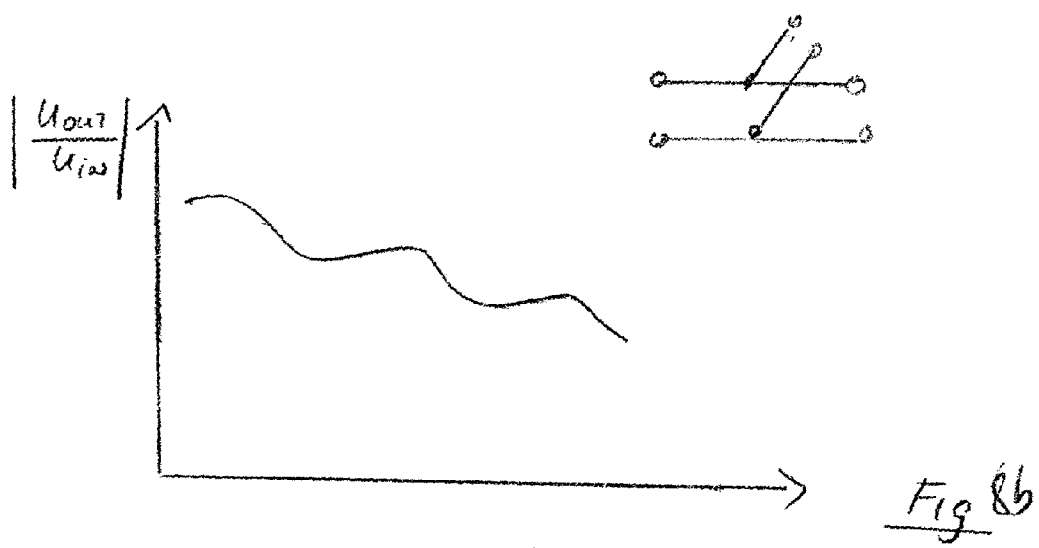

FIG. 8b shows a transfer function of a subscriber line loop 7 having a bridged tap.

As can be seen the bridged tap has a significant influence on the transfer function of the subscriber line loop 7. Accordingly, it is necessary to consider bridged taps when modeling the subscriber line loop 7.

Figure 9A:
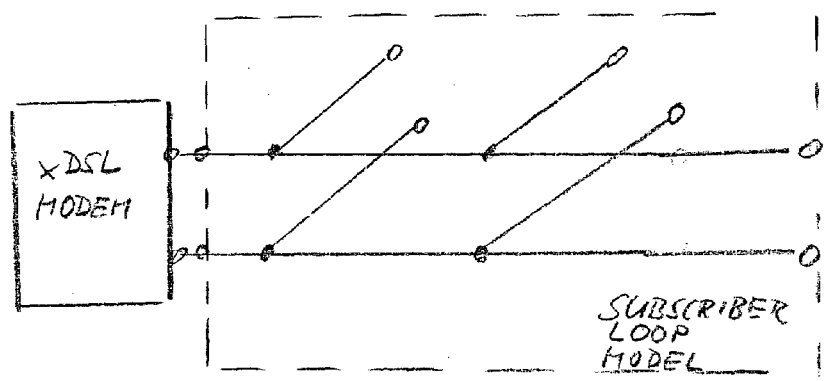
FIGS. 9a and b show a subscriber line loop model (SLLM) as employed in the topology determining unit according to the present invention.

FIG. 9a shows a preferred subscriber line loop model including two bridged taps and three concatenated copper wires.

Figure 9B:
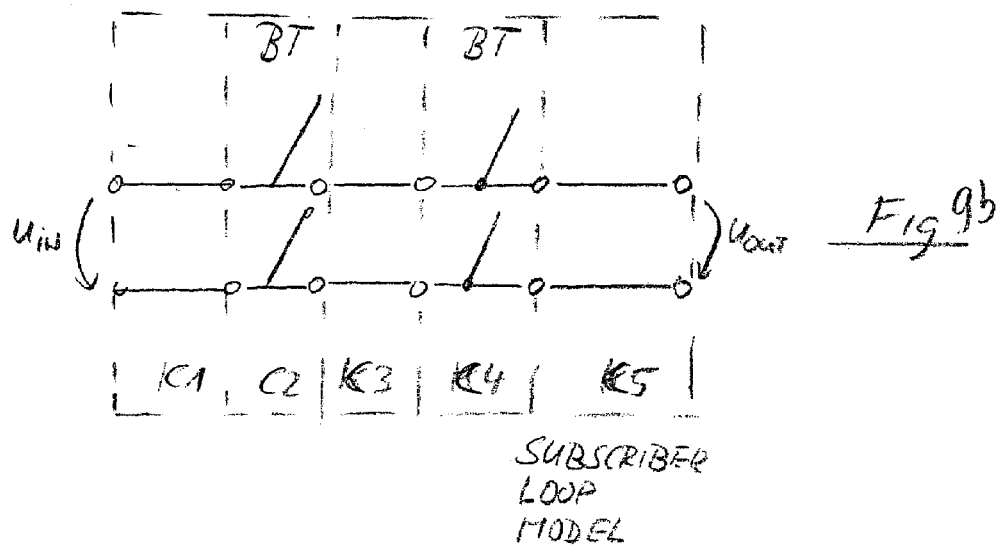

FIG. 9b shows how this subscriber loop model can be transformed into a matrix of several interchained subscriber line parts. The subscriber line loop model SLLM can be expressed as a product of transfer matrices of HK cable portions c1, c2, c3, c4, c5, each having a transfer matrix. In the given example of FIG. 9b, the cable portions c2, c4 represent the bridged taps, and the cable portions c1, c3, c5 represent normal twisted pair wire portions including wires with possible different gauges.

The following equation represents the measurement system:

$$\begin{bmatrix} V_S \\ I_S \end{bmatrix} = \begin{bmatrix} A_S & B_S \\ C_S & D_S \end{bmatrix} \cdot \prod_{i=1}^{n} C_i \begin{bmatrix} A_L & B_L \\ C_L & D_L \end{bmatrix} \cdot \begin{bmatrix} V_L \\ I_L \end{bmatrix} \quad (3)$$

wherein $V_S$, $I_S$ represent the voltage and the current of the signal generator 10, $A_S$, $B_S$, $C_S$, $D_S$ are matrix elements representing the impedance of the signal generator 10, $A_L$, $B_L$, $C_L$, $D_L$ are matrix elements representing the resistance of the load, i.e. the customer's device, $V_L$, $I_L$ represent the voltage and the current at the load, and $C_i$ is a matrix which is a two-by-two matrix describing the current voltage relation at the input and the output of a two-port cable network.

The phasor quantities $A_S$, $B_S$, $C_S$, $D_S$ and $A_L$, $B_L$, $C_L$, $D_L$ are the entries of the ABCD matrices representing the transmit (source) and receive (load) circuitry of the TDR measuring equipment including the transmit and receive filters. These matrices are known and are functions of frequency.

The voltage transfer function of the subscriber line loop can be obtained from equation (3) as $$H(x, f) = \frac{V_L(x, f)}{S_V(x, f)} \quad (4)$$

wherein $$x=[d_1, G_1, d_2, G_2, Kd_n, G_n, Z_l] \quad (5)$$

that is x is the vector of model parameters with $G_i$, i=1, K,n denoting the gauge of the wire which identifies the impedances $Z_{0, i}$ and the propagation constant values $\gamma_i$ and wherein f is a dummy variable indicating frequency dependency of the voltage transfer function.

In each section of the subscriber line loops ABCD matrix, equation (3) is dependent on the parameter vector x.

The computation of the echo response for arbitrarily complex subscriber loops can be performed by computing the ABCD matrix of an elementary loop section and multiplying to ABCD matrices. These computations are performed at multiple frequencies corresponding to the frequency band excited by the transmitted pulse. The predicted echo reception for a given signal pulse is obtained either as frequency domain products or as convolutions in the time domain, after computing the inverse discrete Fourier transform of the echo frequency response for a given loop scenario.

Given the actual measured echo transfer function of the subscriber line loop $H_{SLL}$ and the model transfer function $H_{SLLM}$ (x, f), the parameter optimization unit calculates the model parameter x which minimizes the following error function criteria:

$$\text{error } (x) = \int_{Vf} |H_{SLL}(f) - H(x, f)|^2 \, df \quad (6)$$

The error function is computed through the integration of overall frequency points of interest.

The parameter optimization unit 12c of the evaluation unit 12 optimizes the model transfer function $H_{SLLM}$ selected from the parameter memory 13 such that the error function between the model transfer function $H_{SLLM}$ and the calculated transfer function $H_{SLL}$ of the subscriber line loop 7 is minimized.

Since the error function (6) is non-linear in x it's minimization requires a method which is capable of dealing with multiple minima to find a global minimum of the error function.

A multi-modal non-linear cross-function as given by equation (6) is minimized according to a preferred embodiment by a global optimization algorithm. Possible optimization algorithms are Multi-start methods as described in Törn, A., and Zilinskas, A., "Global Optimization", Lecture Notes in Computer Science, Springer, 1989, "Simulated annealing" as described by Press, W. H. at alii, Numerical Recipes in C, Cambridge University Press, 1992, Evolution Strategies as described by Rechenberg, I., "Evolutionsstrategie", Frommann-Holzboog, 1973, and by Schwefel, H.-P., "Evolution and Optimum Seeking", John Wiley & Sons, 1994, Genetic Algorithms "as described by Holland, J. H., "Outline for a logical theory of adaptive systems", J. Assoc. Comput. Mach., vol. 3, pp. 297-314, 1962, and by Goldberg, D. E., "Genetic Algorithms in Search Optimization & Machine Learning", Addison-Wesley, 1989, or CRS algorithms as described by Ali, M. M., Törn, A., and Viitanen, S., "A Numerical Comparison of Some Modified Controlled Random Search Algorithms", Journal of Global Optimization 11, 1997, pp. 377-385, Particle Swarm Methods as described by Corne, D., Dorigo, M., and Glover, F., "New Ideas on Optimization", McGraw-Hill, 1999, or Differential Evaluation as described by Storn, R. and Price, K., "Differential Evolution—A Simple and Efficient Heuristic for Global Optimization over Continuous Spaces" in Journal of Global Optimization 11, Kluwer Academic Publishers, 1997, pp. 341-359.

In a preferred embodiment of the parameter optimization unit 12c, the differential evolution algorithm is employed. After the initialization, the differential evolution method iterates through a mutation selection cycle, until some stopping criterion, for example the maximum number of allowed iterations, is met.

In its most general form, the differential evolution starts out with a population of NP parameter vectors being described by a δxNP matrix:

$$x=[x_1, x_2, \ldots x_{NP}] \quad (7)$$

each δ dimensional vector $x_j$ is associated with a cost or error value $$e_j = e(x_j, f) = \int_{Vf} |H_{SLL}(f) - H(xj, f)|^2 \, df \quad (8)$$

During the initialization, the initial vectors of X are chosen according to some pertinent method, e.g. random generation of the parameters from a defined interval.

In the mutation circle, during . . . each vector of X has to compete against a trial vector that is generated according to the mutation equation:

$$x_{trial} = x_{r1} + F(x_{r2} - x_{r1}) \quad (9)$$

The vector of X which enters the competition is the target vector, and for each target vector a new trial vector is generated. The vectors $x_{r1}$, $x_{r2}$, $x_{r3}$ are taken from X, i.e. the indices r1, r2, r3 from the set (1, 2, 3, . . . , NP) and are in general chosen to be mutually exclusive. Alternatively, the vectors $x_{r1}$, $x_{r2}$, $x_{r3}$ can also be chosen to be some other vectors like the current best vector, the average vector of X, another randomly chosen vector or the like.

The trial vector then undergoes some recombinations or cross-over operation with yet another vector which means that all parameters of the trial vectors are computed according to equation (9), but some are taken from this other vector.

The weighting variable F is usually a constant real number from the interval [0, 1]. In an alternative embodiment, the weighting variable F is a random number or even a random vector. When the weighting variable F is chosen to be a vector, the random selection of its components from the interval [0.75,1] is beneficial in order to prevent stagnation.

In a selection, in its basic form the cost $c_{trial}=c(x_{trial}, f)$ is computed and compared against $C_{target}=c(x_{target}, f)$.

The vector with the lowest error or cost enters the new population $X_{new}$, where $X_{new}$ may be X itself, i.e. the winner vector immediately replaces the target vector.

In another embodiment, the second matrix for $X_{new}$ is utilized, and X is left intact until all competitions have occurred.

For the new iteration, X is set to $X_{new}$.

Other selection schemes like taking the NP best vectors of X and $X_{new}$ are used in alternative embodiments.

If a vector has components which are out of bounds, the high cost value can be associated with said vector that does not have a chance to survive this selection process.

In other embodiments, the reinitialization of the vector to handle the out-of-bound problem can be employed.

Figure 14:
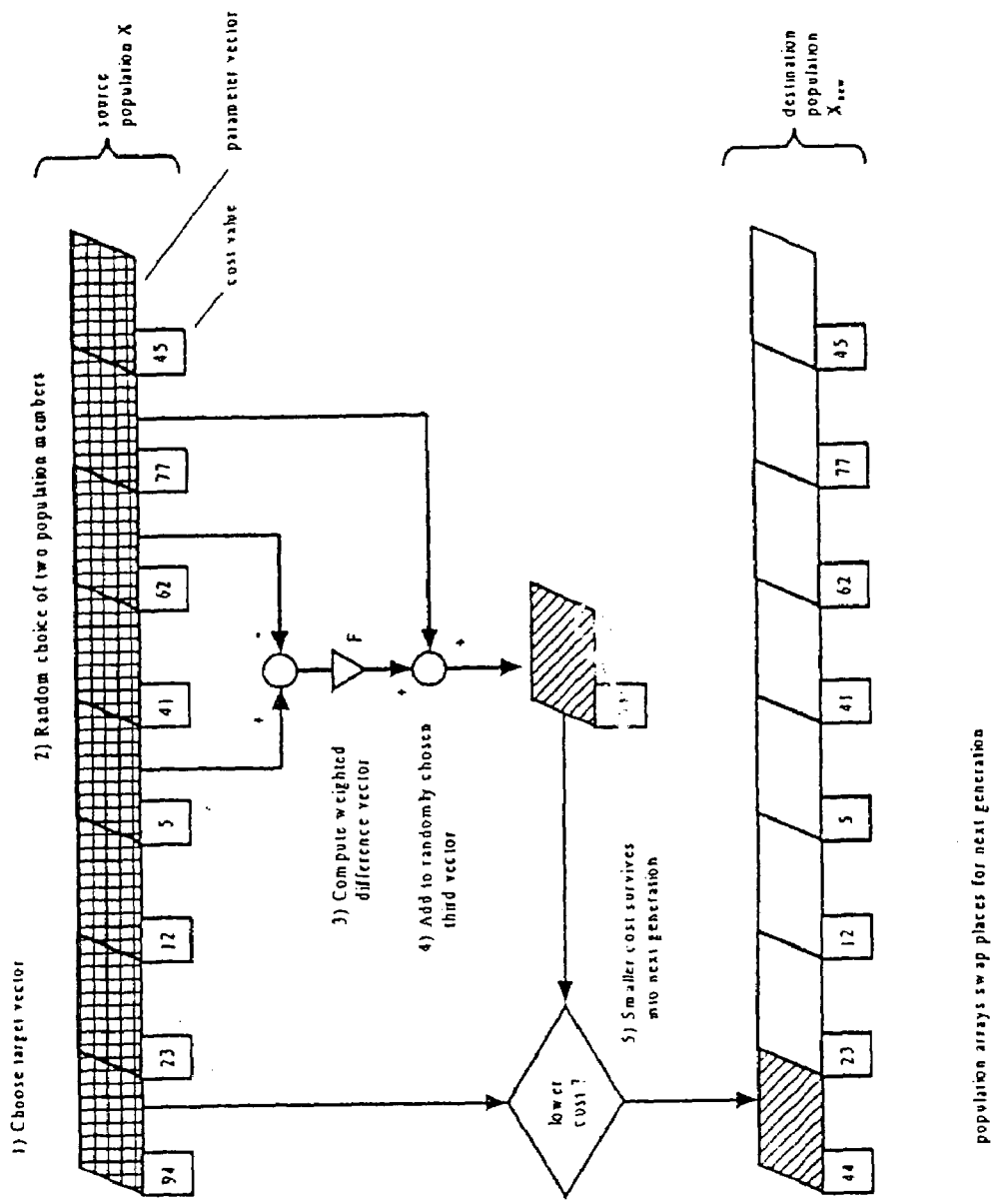
FIG. 14 shows a flow chart of a preferred embodiment of the data evolution algorithm employed by the present invention.

FIG. 14 shows a flow chart of a preferred embodiment of the data evolution algorithm employed by the parameter optimization unit 12c according to the present invention.

FIG. 10 shows an example of the subscriber loop topology as calculated by the parameter optimization unit 12c. The subscriber loop topology lists for the different cable portions $C_1$ to $C_n$, the respective cable length $l_i$, the cable diameter $D_i$ and the cable type $T_i$.

Figure 11:
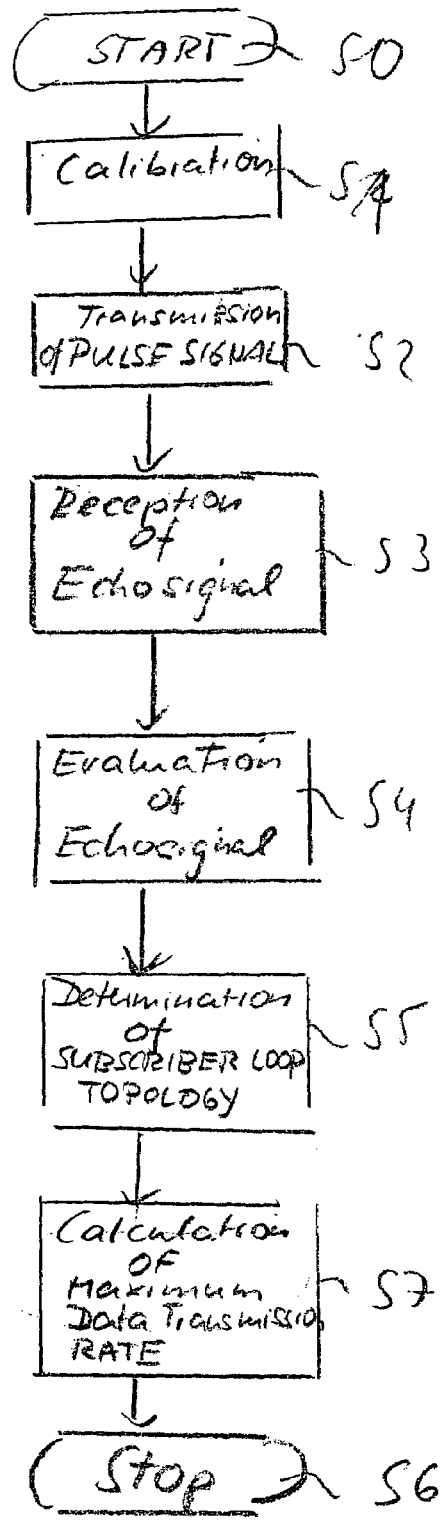
FIG. 11 shows a flow chart of a method for calculating a maximum data transmission bit rate according to the present invention.

FIG. 11 shows a flow chart of a preferred embodiment of the method for determining a topology of a subscriber line loop SLL including steps S0 to S6 as shown in FIG. 4, however, this preferred embodiment additional step S7 is included, wherein on the basis of the determined subscriber line loop topology additionally the maximum possible data transmission bit rate is calculated in a step S7. The calculation of the maximum possible data transmission bit rate in step S7 is performed by a data transmission rate calculation unit 12d within the evaluation unit 12 as shown in FIG. 7.

Figure 12:
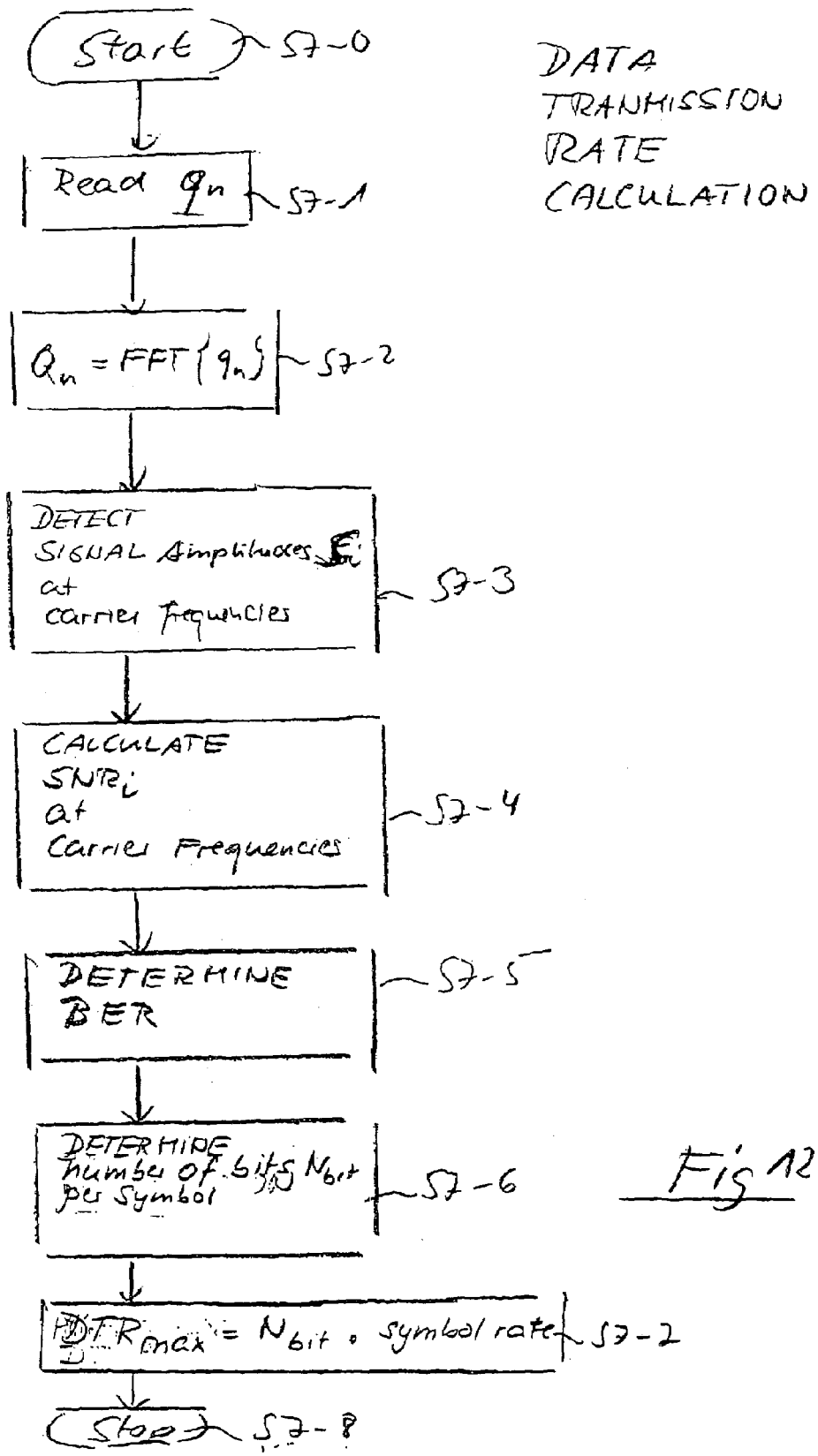
FIG. 12 shows a data transmission bit rate calculation subroutine according to the present invention.

FIG. 12 shows a preferred embodiment of the subroutine for the data transmission bit rate calculation. The subroutine starts in a step S7-0.

In a step S7-1, the echo data samples detected by the echo signal detection unit 11 are read from the memory 11b, and a fast Fourier transformation FFT is performed in a step S7-2.

Figure 13A:
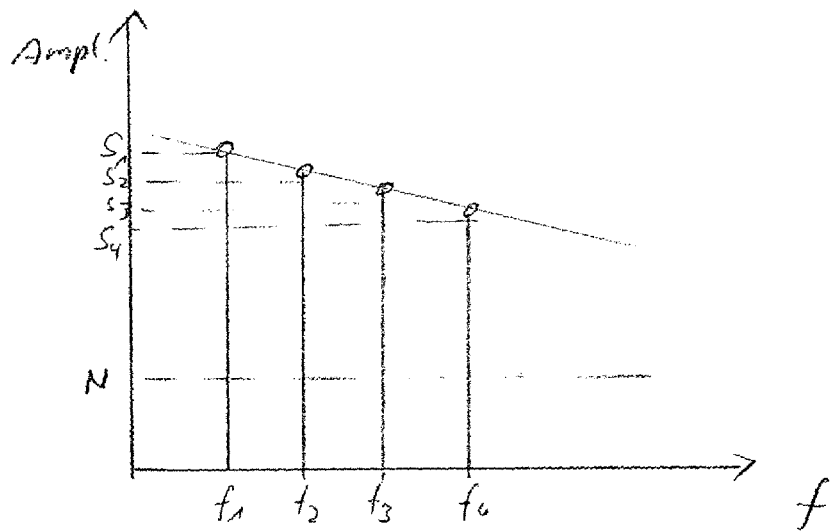
FIGS. 13a and 13b show a diagram illustrating the calculation of a maximum data transmission bit rate according to the present invention.

In a further step S7-3, the signal amplitudes $S_i$ of the received signal are detected at different carrier frequencies $f_i$. In a further step S7-4, the signal-to-noise ratios $SNR_i$ of the detected echo signal are calculated at the different carrier frequencies $f_i$ for a given noise amplitude of e.g. 140 dBm/Hz, as shown in FIG. 13a.

Figure 13B:
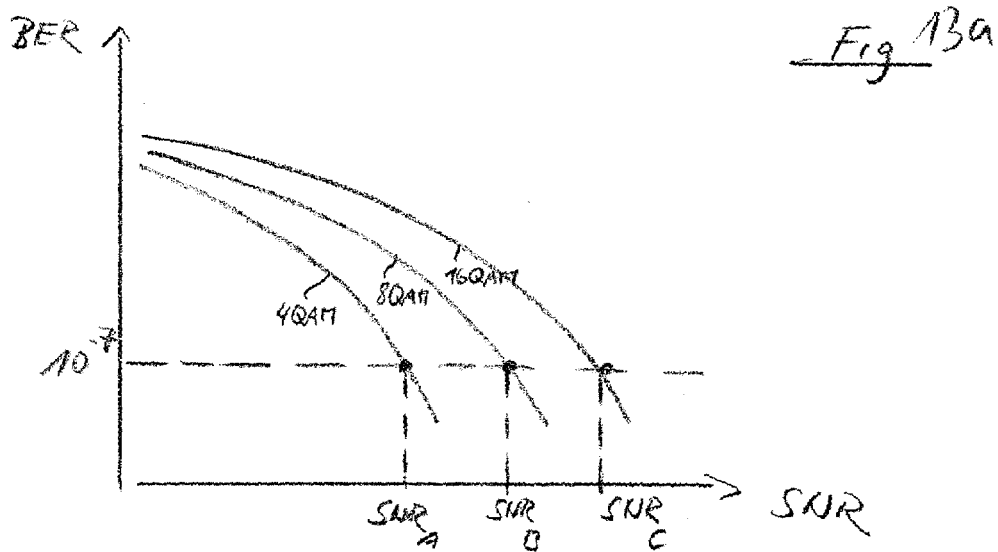

Using a table within the memory of the data transmission bit rate calculation unit 12d from the calculated signal-to-noise ratios $SNR_i$ are determined in a step S7-5 as shown in FIG. 13b.

In a step S7-6, given a predetermined BER (bit error rate) the corresponding modulation scheme, e.g. 4 QAM, 8 QAM, 16 QAM is selected indicating the possible number of bits $N_{bit}$ which can be transmitted for each data symbol. If, for instance, the calculated signal-to-noise ratio for a carrier frequency is between $SNR_B$ and $SNR_C$, the possible modulation scheme is 8 QAM allowing to transmit 3 bits per data symbol.

For 4 QAM, 2 bits can be transmitted, for 8 QAM 3 bits can be transmitted, and when using 16 QAM, 4 bits can be transmitted per data symbol, and so on.

In a further step S7-7, the maximum data transmission bit is calculated by multiplying the detected possible number of bits per symbol with the known data symbol rate. The multiplication is performed by the data transmission calculation unit 12d.

The use of the differential evolution optimization algorithm allows the loop characterization of the subscriber line loop SLL with a minimum of resources like memory and computing power. The topology determining unit is integrated within the xDSL modem 1 wherein in a possible embodiment the topology determining unit is integrated on one chip. The topology determining unit allows to determine the physical structure of a subscriber line loop SLL including the length of the individual wire section and their structural relations to each other.

Further it is possible to detect load coils or pupin coils and to predict their distance from the topology determining unit.

The integration of the topology determining unit into the xDSL modem makes it possible to determine the SLL-topology with no external measurement equipment and without employment of a technician.

The xDSL modem as shown in FIG. 2 is in a preferred embodiment an ADSL modem. In a preferred embodiment, the subscriber line loop models SLLMs stored in the parameter memory 13 are programmable via an interface. This allows that the xDSL modem 1 according to the present invention can be used for any telephone infrastructure.

In a preferred embodiment, the calculated maximum data transmission bit rate is read from the evaluation unit 12 via a line so that the customer can be informed by the service provider automatically about the possible maximum data transmission bit rate. The xDSL modem 1 allows the service provider to save costs because no external measurement equipment is necessary and no technician has to handle the measurement. The subscriber line topology can be determined automatically, and the maximum possible data transmission bit rate can be calculated automatically and provided for the user.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. An xDSL modem for data transmission between a central office and a customer device over a subscriber line, the xDSL modem comprising a topology determining unit configured to determine the topology of the subscriber line, and further comprising a control unit configured to switch the xDSL modem between a normal mode for data transmission and a topology determining mode for determining the topology of the subscriber line.

2. The xDSL modem according to claim 1, wherein the topology determining unit comprises:
    (a) a signal generator configured to generate at least one signal pulse which is transmitted to subscriber line loop;
    (b) an echo detection unit configured to detect an echo signal received from the subscriber line loop; and
    (c) an evaluation unit connected to said echo detection unit, said evaluation unit comprising:

(c1) a deconvolution unit configured to deconvolve the detected echo signal to determine a transfer function $H_{ML}$ of a measurement loop between said signal generator and said echo detection unit;

(c2) a calculation unit configured to calculate a transfer function $H_{SLL}$ of the subscriber line loop between the xDSL modem and the customer device on the basis of the determined transfer function $H_{ML}$ of the measurement loop; and (c3) a model parameter optimization unit configured to optimize a model transfer function $H_{SLLM}$ of the subscriber line loop model such that an error function between the model transfer function $H_{SLLM}$ and the calculated transfer function $H_{SLL}$ of the subscriber line loop is minimized.

3. The xDSL modem according to claim 2, further comprising a model parameter memory configured to memorize at least one parameter vector comprising model parameters of a subscriber line loop model.

4. The xDSL modem according to claim 1, wherein said control unit is configured to switch, in the topology determining mode, a signal generator of the topology determining unit to the subscriber line loop by a first switch and the echo determining unit to the subscriber line loop by a second switch.

5. The xDSL modem according to claim 3, wherein the model parameter memory comprises a plurality of parameter vectors corresponding to different subscriber line loop models.

6. The xDSL modem according to claim 5, wherein a parameter vector is selected by the control unit for optimization by the parameter optimization unit.

7. The xDSL modem according to claim 2, wherein the optimised model parameters indicate the subscriber line loop topology.

8. The xDSL modem according to claim 1, wherein the customer device is a telephone.

9. The xDSL modem according to claim 8, wherein a probing signal is sent to detect whether the telephone is on hook or off hook.

10. The xDSL modem according to claim 9, wherein the control unit does not switch to the topology determining mode when the telephone is off hook.

11. The xDSL modem according to claim 2, wherein the evaluation unit comprises a data transmission bit rate calculation circuit configured to calculate in a maximum data transmission bit rate of the subscriber line depending on the detected echo signal and a data symbol rate.

12. The xDSL modem according to claim 2, wherein said signal generator is configured to generate a sequence comprising a plurality of signal pulses.

13. The xDSL modem according to claim 12, wherein the amplitude of each pulse is smaller than a dynamic range of an analogue front end of the xDSL modem.

14. The xDSL modem according to claim 1, further comprising an echo cancellation unit configured to be activated in the normal mode, and deactivated in the topology determining mode.

15. A topology determining unit for determining a topology of a subscriber line loop, the unit comprising:

(a) a deconvolution unit configured to deconvolve an echo signal of at least one signal pulse sent by that topology determining circuit to determine a first transfer function $H_{ML}$ of a measurement loop;

(b) a calculation unit configured to calculate a second transfer function $H_{SLL}$ of the subscriber line loop on the basis of the first transfer function $H_{ML}$; and (c) a model parameter optimization unit configured to optimize a model transfer function $H_{SLLM}$ of a subscriber line loop model such that an error function of the difference between the model transfer function $H_{SLLM}$ and the calculated second transfer function $H_{SLL}$ of that subscriber line loop is minimal.

16. An optimization unit for providing a topology of a subscriber line loop, the optimization unit configured to optimize model parameters of a predetermined transfer function $H_{SLLM}$ of a subscriber line loop model stored in a memory such that an error function of the difference between the model transfer function $H_{SLLM}$ and a calculated function $H_{SLL}$ of the subscriber line loop is minimized, wherein the optimized model parameters output by said optimization unit indicate the topology of said subscriber line loop.

17. A method for determining a topology of a subscriber line loop, the method comprising:

(a) optimizing the model parameters of a model transfer function $H_{SLLM}$ of a subscriber line loop model stored in a memory such that an error function of a difference between a model transfer function $H_{SLLM}$ and a calculated transfer function $H_{SLL}$ of the subscriber line loop is minimized; and (b) outputting the optimized model parameters which indicate the topology of said subscriber line loop.

18. A method for determining a topology of a subscriber line loop comprising the following steps:

(a) transmitting at least one signal pulse generated by a signal generator to a subscriber line;

(b) detecting the echo signal received from the subscriber line loop via an echo signal detection unit;

(c) deconvolving the detected echo signal to determine a transfer function $H_{ML}$ of a measurement loop between the signal generator and said echo detection unit;

(d) calculating a transfer function $H_{SLL}$ of the subscriber line loop on the basis of determined transfer function $H_{ML}$ of the measurement loop;

(e) optimizing a subscriber line loop model transfer function $H_{SLLM}$ such that an error function of the difference between the model transfer function $H_{SLLM}$ and a calculated transfer function $H_{SLL}$ of the subscriber line loop is minimized; and (f) outputting the model parameters of the optimized transfer function $H_{SLLM\ opt}$ of the subscriber line loop model as the topology of the subscriber line loop.

* * * * *